United States Patent
Hara et al.

(10) Patent No.: US 12,263,884 B2
(45) Date of Patent: Apr. 1, 2025

(54) VEHICLE FRONT SECTION STRUCTURE

(71) Applicant: TOYOTA JIDOSHA KABUSHIKI KAISHA, Toyota (JP)

(72) Inventors: Yasuhiro Hara, Nagoya (JP);
Norimasa Koreishi, Miyoshi (JP);
Jumpei Watanabe, Nagakute (JP);
Hirotaka Ishioka, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 259 days.

(21) Appl. No.: 17/843,608

(22) Filed: Jun. 17, 2022

(65) Prior Publication Data

US 2022/0402553 A1 Dec. 22, 2022

(30) Foreign Application Priority Data

Jun. 22, 2021 (JP) ................................ 2021-103517

(51) Int. Cl.
*B62D 21/15* (2006.01)
*B60K 1/04* (2019.01)
(Continued)

(52) U.S. Cl.
CPC .............. *B62D 21/152* (2013.01); *B60K 1/04* (2013.01); *B62D 25/08* (2013.01); *B62D 25/20* (2013.01);
(Continued)

(58) Field of Classification Search
CPC ...... B62D 21/152; B62D 25/20; B62D 25/08; B62D 21/02; B62D 33/06; B62D 47/02;
(Continued)

(56) References Cited

U.S. PATENT DOCUMENTS 7,210,733 B2 * 5/2007 Mouch ................... B62D 21/11
296/203.02
7,669,688 B2 * 3/2010 Yamaguchi .......... B62D 21/152
180/312
(Continued)

FOREIGN PATENT DOCUMENTS

CN 109109979 A 1/2019
DE 102010009611 A1 8/2011
(Continued)

*Primary Examiner* — Amy R Weisberg
*Assistant Examiner* — Dana D Ivey
(74) *Attorney, Agent, or Firm* — Dinsmore & Shohl LLP (57) ABSTRACT

A vehicle front section structure including left and right front side frames, and left and right front side members. The left and right front side frames extend along a vehicle front-rear direction at respective sides in a vehicle width direction with respect to the power unit. A lower kick section sloping with a downward gradient on progression toward a vehicle rear side is formed at a rear section of each of the front side frames. The left and right front side members extend along the vehicle front-rear direction at a vehicle upper side of the left and right front side frames, are supported by the left and right front side frames, and configure part of a vehicle body. An upper kick section sloping with a downward gradient on progression toward the vehicle rear side is formed at a rear section of each of the front side members.

11 Claims, 8 Drawing Sheets

(51) Int. Cl.
*B62D 25/08* (2006.01)
*B62D 25/20* (2006.01)
*B62D 21/02* (2006.01)
*B62D 33/06* (2006.01)
*B62D 47/02* (2006.01)

(52) U.S. Cl.
CPC ...... *B60K 2001/0411* (2013.01); *B62D 21/02* (2013.01); *B62D 25/085* (2013.01); *B62D 33/06* (2013.01); *B62D 47/02* (2013.01)

(58) Field of Classification Search
CPC .................. B62D 25/085; B60K 1/04; B60K 2001/0411
USPC ............. 296/187.09, 187.08, 203.02, 193.07
See application file for complete search history.

(56) References Cited

U.S. PATENT DOCUMENTS

| | | | | |
|---|---|---|---|---|
| 8,201,873 | B2* | 6/2012 | Nishimura | B62D 25/088 296/193.06 |
| 10,173,731 | B2* | 1/2019 | Nakauchi | B60R 21/34 |
| 10,252,750 | B2* | 4/2019 | Kodama | B62D 21/02 |
| 2008/0284151 | A1 | 11/2008 | Mandel et al. | |
| 2017/0291643 | A1* | 10/2017 | Sakamoto | B60L 50/51 |
| 2018/0370575 | A1 | 12/2018 | Takii | |
| 2019/0263450 | A1* | 8/2019 | Inoue | B62D 21/152 |
| 2020/0047811 | A1* | 2/2020 | Shimizu | B62D 21/02 |
| 2020/0062133 | A1 | 2/2020 | Tsuruta et al. | |
| 2020/0086926 | A1* | 3/2020 | Hashida | B60R 19/12 |
| 2020/0130495 | A1 | 4/2020 | Shimizu | |

FOREIGN PATENT DOCUMENTS

| | | | |
|---|---|---|---|
| JP | S62110538 A | * | 11/1985 |
| JP | S62-139787 U | | 9/1987 |
| JP | 2005067268 A | * | 3/2005 |
| JP | 2005-119566 A | | 5/2005 |
| JP | 2005-186727 A | | 7/2005 |
| JP | 2005-231436 A | | 9/2005 |
| JP | 2007-168556 A | | 7/2007 |
| JP | 2011-020628 A | | 2/2011 |
| JP | 2020-029134 A | | 2/2020 |

* cited by examiner

VEHICLE FRONT SECTION STRUCTURE

CROSS-REFERENCE TO RELATED APPLICATION

This application is based on and claims priority under 35 USC 119 from Japanese Patent Application No. 2021-103517 filed on Jun. 22, 2021, the disclosure of which is incorporated by reference herein.

BACKGROUND

Technical Field

The present disclosure relates to a vehicle front section structure.

Related Art

In a cab-over truck disclosed in Japanese Patent Application Laid-Open (JP-A) No. 2007-168556, an engine disposed below a cabin is supported by a front section of a chassis frame. A floor member configuring part of a framework of the cabin is disposed above the front section of the chassis frame. The floor member extends along a vehicle front-rear direction, and a front end portion and a rear end portion of the floor member are supported by the chassis frame.

SUMMARY

In the above related art, the engine is mounted to the front section of the chassis frame. In cases in which a power unit including a motor is installed instead of an engine, an electronic unit that controls power supplied to the motor is sometimes installed above the motor. In such vehicles, if for example the front section of the chassis frame is deformed toward the upper side at a time of head-on collision, the electronic unit supported by the front section of the chassis frame might crash into the cabin and incur damage as a result. Since high pressure power is supplied to the electronic unit, measures to prevent such damage are required.

In consideration of the above circumstances, the present disclosure obtains a vehicle front section structure that is capable of preventing a power unit from crashing into a vehicle body at a time of head-on collision.

A vehicle front section structure of a first aspect of the present disclosure includes a power unit, left and right front side frames, and left and right front side members. The power unit is disposed at a front section of a vehicle. The left and right front side frames extend along a vehicle front-rear direction at respective sides in a vehicle width direction with respect to the power unit, configure a front section of a frame of the vehicle, and support the power unit. A lower kick section sloping with a downward gradient on progression toward a vehicle rear side is formed at a rear section of each of the front side frames. The left and right front side members extend along the vehicle front-rear direction at a vehicle upper side of the left and right front side frames, are supported by the left and right front side frames, and configure a part of a vehicle body. An upper kick section sloping with a downward gradient on progression toward the vehicle rear side is formed at a rear section of each of the front side members.

In the first aspect, the left and right front side frames and the left and right front side members undergo deformation at the respective lower kick sections and upper kick sections in a vehicle head-on collision. This deformation enables collision load to be absorbed. Moreover, as a result of this deformation, the left and right front side frames and the left and right front side members are displaced obliquely toward the vehicle upper-rear side in a parallel or substantially parallel state. When this occurs, the power unit disposed between the left and right front side frames and supported by the left and right front side frames is displaced obliquely toward the vehicle upper-rear side together with the vehicle body, configured in part by the left and right front side members. This enables the power unit to be prevented from crashing into the vehicle body.

A vehicle front section structure of a second aspect of the present disclosure is the first aspect, wherein the vehicle body includes a floor member that configures a floor section of a vehicle cabin, that is disposed at a vehicle upper side of the power unit, and that is supported by the left and right front side members.

In the second aspect, in a vehicle head-on collision, the left and right front side frames and the left and right front side members undergo deformation at the respective upper kick sections and lower kick sections. Thus, the power unit supported by the left and right front side frames is displaced obliquely toward the vehicle upper-rear side together with the floor member supported by the left and right front side members and disposed at the vehicle upper side of the power unit. This enables the power unit to be prevented from crashing into the floor member.

A vehicle front section structure of a third aspect of the present disclosure is the first aspect or the second aspect, further including a cross member that connects front end portions of the upper kick sections in the vehicle width direction.

In the third aspect, the front end portions of the upper kick sections of the left and right front side members are connected in the vehicle width direction by the cross member. This for example enables the deformation at the upper kick sections of the left and right front side members to be stabilized.

A vehicle front section structure of a fourth aspect of the present disclosure is the third aspect, further including a seat frame that is configured to support a seat of the vehicle and has a front end portion supported by the cross member.

In the fourth aspect, the front end portion of the seat frame that supports the vehicle seat is supported by the cross member. In a vehicle head-on collision, the left and right front side members undergo deformation at the upper kick sections, and the cross member is displaced obliquely toward the vehicle upper-rear side, namely toward the opposite side to an object that has collided with the vehicle, together with the left and right front side members and the seat frame. This enables the seat supported by the seat frame to be made to retreat toward the opposite side to the colliding object.

A vehicle front section structure of a fifth aspect of the present disclosure is any one of the first aspect to the fourth aspect, wherein a deformation portion configured to undergo compression deformation in the vehicle front-rear direction at a time of head-on collision of the vehicle is provided at a front section of each of the left and right front side frames. Front sections of the left and right front side members and the respective deformation portions are connected by left and right coupling members configured so as to more readily undergo plastic deformation under collision load at a time of head-on collision than the left and right front side members.

In the fifth aspect, the deformation portions that undergo compression deformation in the vehicle front-rear direction in a vehicle head-on collision are provided at the front sections of the left and right front side frames, and the respective deformation portions and the front sections of the left and right front side members are connected by the left and right coupling members. Thus, the front sections of the left and right front side members are supported by the left and right deformation portions through the left and right coupling members. The left and right coupling members are configured so as to more readily undergo plastic deformation under collision load at a time of head-on collision than the left and right front side members, and so undergo plastic deformation when the left and right deformation portions undergo compression deformation. Thus, even in configurations in which the left and right coupling members are connected to the left and right deformation portions, the left and right coupling members can be prevented from hindering compression deformation of the left and right deformation portions. This enables deformation stroke of the left and right deformation portions to be set longer in the vehicle front-rear direction. Moreover, the left and right coupling members can also be utilized as members to absorb collision load. This enables collision load absorption performance to be improved.

As described above, the vehicle front section structure according to the present disclosure is capable of preventing the power unit from crashing into the vehicle body at a time of head-on collision.

BRIEF DESCRIPTION OF THE DRAWINGS

Exemplary embodiments of the present disclosure will be described in detail based on the following figures, wherein.

DETAILED DESCRIPTION

Explanation follows regarding a vehicle front section structure 10 according to an exemplary embodiment of the present disclosure, with reference to FIG. 1 to FIG. 8. Note that some of the reference numerals may be omitted from the drawings in order to facilitate viewing of the drawings. In the respective drawings, the arrow FR, the arrow LH, and the arrow UP respectively indicate a vehicle front side (direction of progress), a vehicle left side, and a vehicle upper side, as appropriate. Moreover, unless specifically stated otherwise, simple reference to front and rear, left and right, and up and down directions refers to front and rear in a vehicle front-rear direction, left and right in a vehicle left-right direction (vehicle width direction), and up and down in a vehicle vertical direction.

Configuration

As illustrated in FIG. 1 to FIG. 8, a vehicle 12 applied with the vehicle front section structure 10 according to the present exemplary embodiment is what is referred to as a body-on-frame vehicle in which a vehicle body 40 is supported by a ladder frame 14. As an example, the vehicle 12 is a bus. Although not illustrated in the drawings, the vehicle body 40 of the vehicle 12 has a substantially rectangular block-shaped external profile. As an example, the vehicle 12 is an electric vehicle. First, explanation follows regarding an outline of a framework structure of the vehicle 12.

The ladder frame 14 includes a left and right pair of side frames 16 and plural cross members 22, 24. The left and right side frames 16 extend along the front-rear direction at both vehicle width direction side sections of the vehicle 12. The plural cross members 22, 24 each extend along the vehicle width direction so as to be arrayed in the front-rear direction with a spacing therebetween. The left and right side frames 16 are connected in the vehicle width direction by the plural cross members 22, 24.

The left and right side frames 16 are respectively configured by left and right front side frames 18, left and right central side frames 20, and left and right rear side frames (not illustrated in the drawings). The left and right front side frames 18 extend along the front-rear direction at both vehicle width direction side sections of a front section of the vehicle 12. The left and right central side frames 20 extend along the front-rear direction at both vehicle width direction side sections of a front-rear direction central section of the vehicle 12. The left and right rear side frames extend along the front-rear direction at both vehicle width direction side sections of a rear section of the vehicle 12. The front side frames 18, the central side frames 20, and the rear side frames are each formed in an angular tube shape using a steel material or the like, and each have a rectangular closed cross-section profile as viewed along the front-rear direction. Note that plural non-illustrated cross members are also provided between the left and right central side frames 20, and between the left and right rear side frames.

A front section 18F of each of the left and right front side frames 18 extends in a straight line along the front-rear direction. A front end portion of each of the front sections 18F (namely, a front end portion of each of the left and right front side frames 18) configures a deformation portion 18F1 that undergoes axial compression deformation in the front-rear direction at a time of head-on collision of the vehicle 12. Plural beads 19 that extend along the vertical direction as an example are formed arrayed along the front-rear direction on left and right side faces of each of the deformation portions 18F1. The deformation portions 18F1 are therefore weaker with respect to load in the front-rear direction than other locations of the respective front sections 18F. Front-rear direction intermediate portions of the respective front sections 18F are connected in the vehicle width direction by the cross member 22. A suspension tower 26 is fixed to a vehicle width direction outer face of each of the front sections 18F.

A front side portion of a rear section 18R of each of the left and right front side frames 18 configures a lower kick section 18R1 that slopes with a downward gradient on progression toward the rear side. A rear side portion of the rear section 18R extends in a straight line along the front-rear direction. Each of the rear sections 18R is bent into substantially a crank shape at bend portions 181, 182 on both front and rear sides of the lower kick section 18R1. The bend portion 181 on the front side is bent so as to bulge toward the upper-rear side, whereas the bend portion 182 on the rear side is bent so as to bulge toward the lower-front side. Front portions of the respective lower kick sections 18R1 (namely, front portions of the respective rear sections 18R) are connected in the vehicle width direction by the cross member 24. Front end portions of the left and right central side frames 20 are joined to rear end portions of the respective rear sections 18R.

A motor 32 (not illustrated in FIG. 4 to FIG. 7) for causing the vehicle 12 to travel is disposed between the left and right front side frames 18. The motor 32 is supported by the left and right front side frames 18 through the cross members 22, 24 and a non-illustrated support member or the like. An electronic unit 34 that controls power supplied to the motor 32 is disposed above the motor 32. The electronic unit 34 is supported by the left and right front side frames 18 through a support frame 36. As an example, the support frame 36 includes a front and rear pair of cross frame sections (not allocated reference numerals) that span between the left and right front side frames 18, and a left and right pair of side frame sections (not allocated reference numerals) that span between the front and rear cross frame sections, so as to have a ladder shape in plan view. The motor 32 and the electronic unit 34 configure a power unit 30.

The vehicle body 40 is supported from the lower side by the ladder frame 14 with the above configuration. The vehicle body 40 includes floor paneling 44 configuring floor sections of a vehicle cabin 42, and a left and right pair of front side members 48. The floor paneling 44 corresponds to a "floor member" of the present disclosure. The floor paneling 44 includes a front floor panel 46 configuring a floor section at a front section of the vehicle cabin 42, a central floor panel 47 configuring a floor section at a front-rear direction intermediate section of the vehicle cabin 42, and a rear floor panel (not illustrated in the drawings) configuring a floor section at a rear section of the vehicle cabin 42. The front floor panel 46, the central floor panel 47, and the rear floor panel are each configured of sheet steel or the like.

A front section of the front floor panel 46 configures a driving seat floor section 46F extending along the front-rear direction and the vehicle width direction. A rear section of the front floor panel 46 configures a sloped section 46R that slopes with a downward gradient on progression toward the vehicle rear side. The driving seat floor section 46F is disposed spaced apart from and at the upper side with respect to the front sections 18F of the left and right front side frames 18, and the sloped section 46R is disposed spaced apart from and at the upper side with respect to the rear sections 18R of the left and right front side frames 18. The above-mentioned electronic unit 34 is disposed below the driving seat floor section 46F. A front end portion of the central floor panel 47 is joined to a rear end portion of the sloped section 46R. The central floor panel 47 extends along the front-rear direction and the vehicle width direction. A non-illustrated battery that stores power for supply to the above-mentioned motor 32 is disposed below the central floor panel 47. High pressure power supplied from the battery to the electronic unit 34 is supplied to the motor 32 under the control of the electronic unit 34.

The front floor panel 46 is supported by the left and right front side frames 18 through the left and right pair of front side members 48. The left and right front side members 48 configure part of the vehicle body 40, and extend along the front-rear direction at the upper side and vehicle width direction outside with respect to the left and right front side frames 18. The left and right front side members 48 are each manufactured by for example pressing sheet steel, and are joined to a lower face of the front floor panel 46 by welding. Specifically, each of the front side members 48 has a hat-shaped cross-section profile open toward the upper side as viewed along the front-rear direction, and is joined to the lower face of the front floor panel 46 at left and right flanges (not allocated reference numerals) provided at upper end portions of the front side member 48. Thus, a closed cross-section extending along the vehicle front-rear direction is formed by each of the front side members 48 and the front floor panel 46.

A front section 48F of each of the left and right front side members 48 extends in a straight line along the front-rear direction, and is joined to a lower face of the driving seat floor section 46F of the front floor panel 46. A rear section 48R of each of the left and right front side members 48 configures an upper kick section 48R that slopes with a downward gradient on progression toward the vehicle rear side, and is joined to a lower face of the sloped section 46R of the front floor panel 46. Each of the upper kick sections 48R is bent into substantially a crank shape at bend portions 481, 482 on both front and rear sides. The bend portion 481 on the front side is bent so as to bulge toward the upper-rear side, whereas the bend portion 482 on the rear side is bent so as to bulge toward the lower-front side.

A front cross member 50 that extends along the vehicle width direction is disposed at front end portions of the left and right front side members 48. The front cross member 50 is configured of sheet steel or the like, and has a hat-shaped cross-section profile open toward the front side as viewed along the vehicle width direction. A flange that for example overlays a rear face of the front cross member 50 is provided at the front end portion of each of the left and right front side members 48, and the flange is fixed to the rear face of the front cross member 50 by bolt-fastening. The front end portions of the left and right front side members 48 are thereby connected in the vehicle width direction by the front cross member 50.

Both vehicle width direction end portions of the front cross member 50 are supported by the front end portions (namely, the respective deformation portions 18F1) of the left and right front side frames 18 through left and right front pillar members 52. Each of the left and right front pillar members 52 is for example formed by pressing sheet steel, and has a box shape open toward the front and upper sides. For example, a non-illustrated flange formed to an upper end portion of each of the front pillar members 52 is fixed to the front cross member 50 by welding or bolt-fastening. A lower end portion of each of the front pillar members 52 is fixed to the corresponding front side frame 18 through a bracket 54. The bracket 54 is fixed to a vehicle width direction outside face of the corresponding deformation portion 18F1 by welding. The front pillar member 52 is mounted on an upper face of the corresponding bracket 54, and is fixed to the bracket 54 by bolt-fastening.

Front end portions of the respective upper kick sections 48R of the left and right front side members 48 are supported by the left and right front side frames 18 through left and right rear pillar members 56. Each of the left and right rear pillar members 56 is for example formed by pressing sheet steel, and has a box shape open toward the vehicle width direction center side and the upper side. For example, a flange formed to an upper end portion of each of the rear pillar members 56 is fixed to the front end portion of the corresponding upper kick section 48R by welding. A lower end portion of each of the rear pillar members 56 is fixed to the corresponding front side frame 18 through a bracket 58. The bracket 58 is fixed to a vehicle width direction outside face of the front end portion of the corresponding upper kick section 48R by welding. The corresponding rear pillar member 56 is mounted on an upper face of the bracket 58, and is fixed to the bracket 58 by bolt-fastening.

The left and right front side members 48 are supported from the lower side by the left and right front side frames 18 through the front cross member 50, the front pillar members 52, the brackets 54, the rear pillar members 56, and the brackets 58. The front floor panel 46 is supported from the lower side by the left and right front side members 48. An instrument panel 60 is mounted and fixed to an upper face of the front section of the front floor panel 46.

Figure 1:
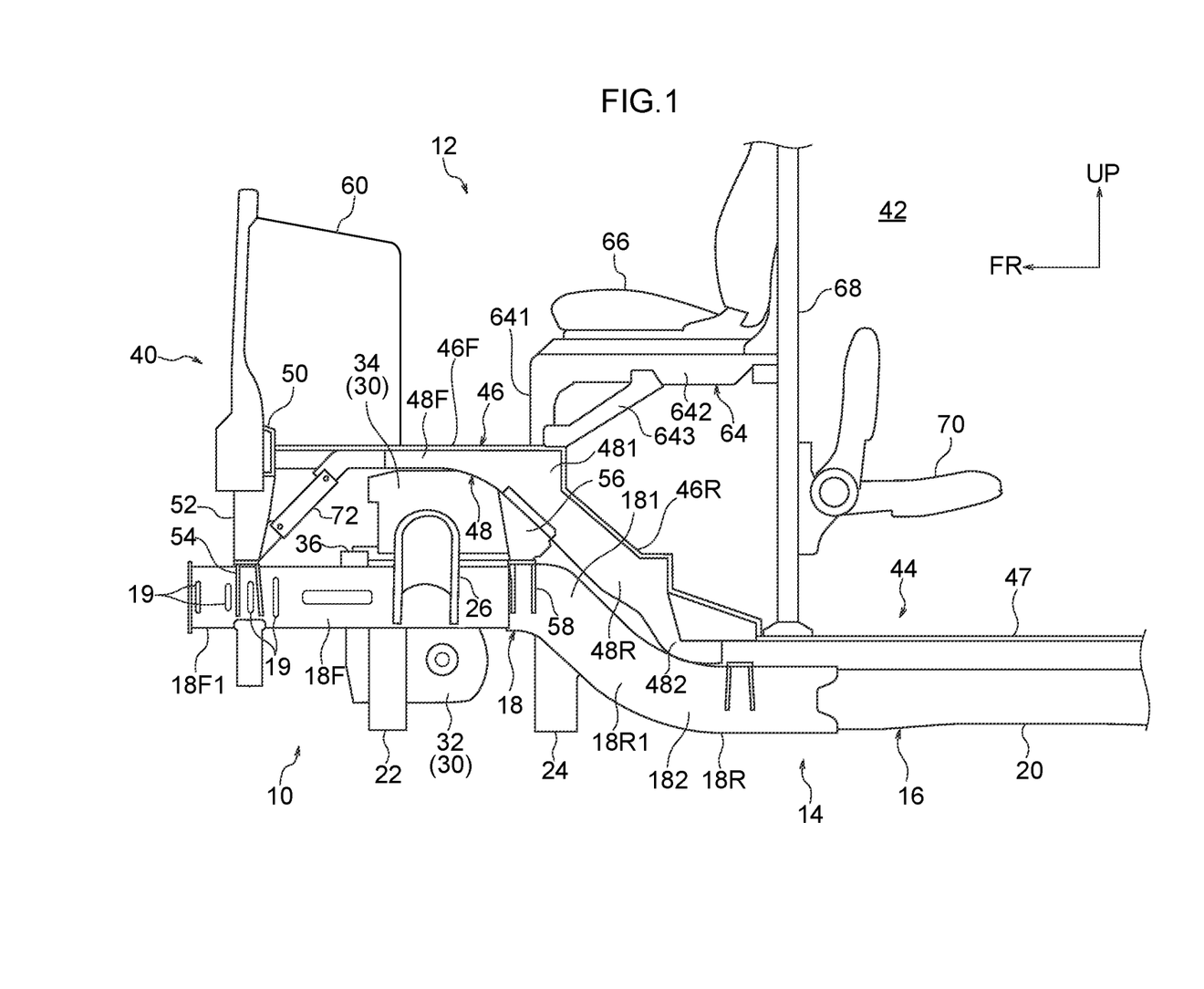
FIG. 1 is a side view illustrating part of a configuration of a front section of a vehicle applied with a vehicle front section structure according to an exemplary embodiment.
Figure 2:
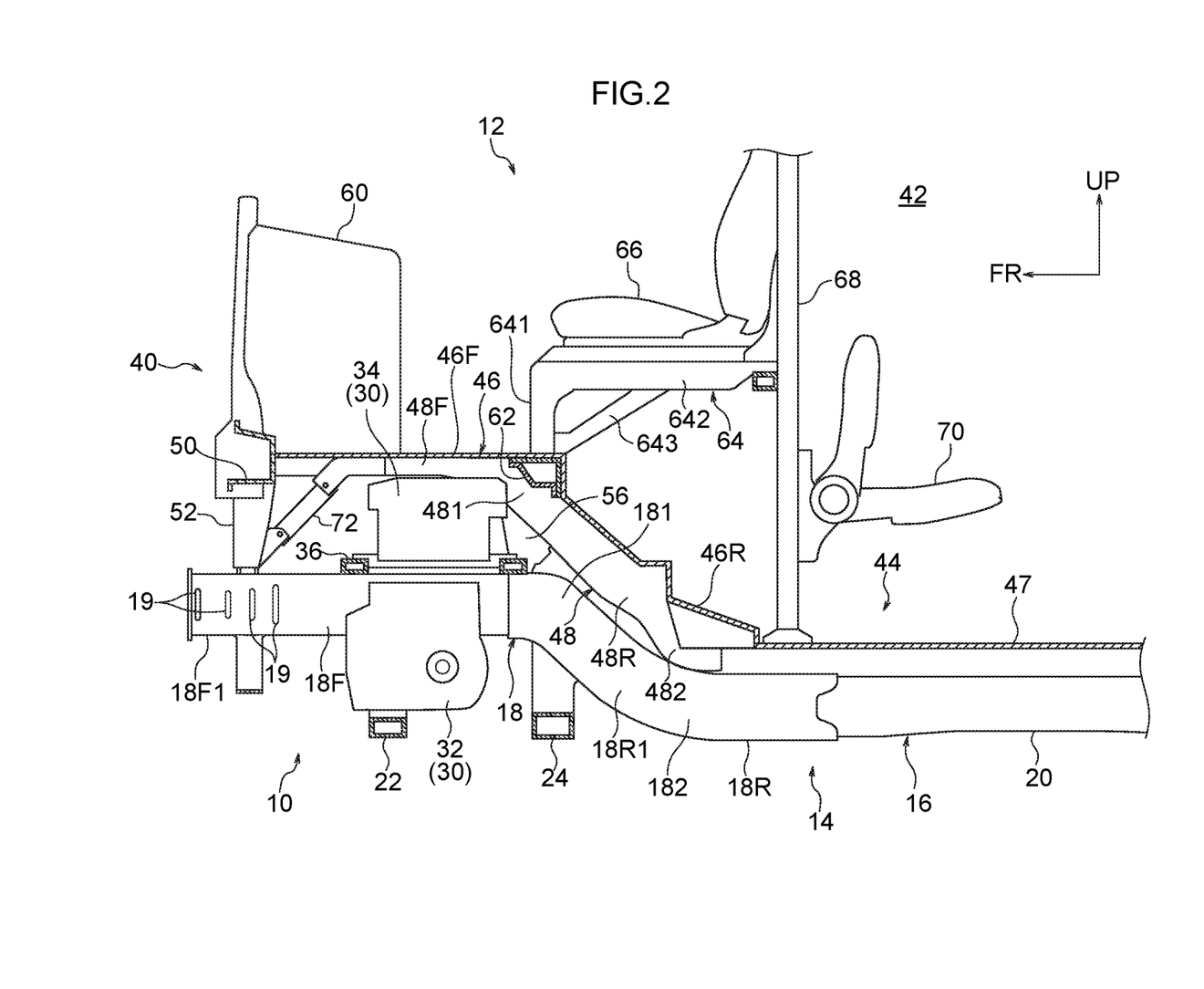
FIG. 2 is a cross-section illustrating a state in which the configuration illustrated in FIG. 1 has been sectioned slightly further toward a vehicle width direction center side than a front side frame on a vehicle left side.
Figure 3:
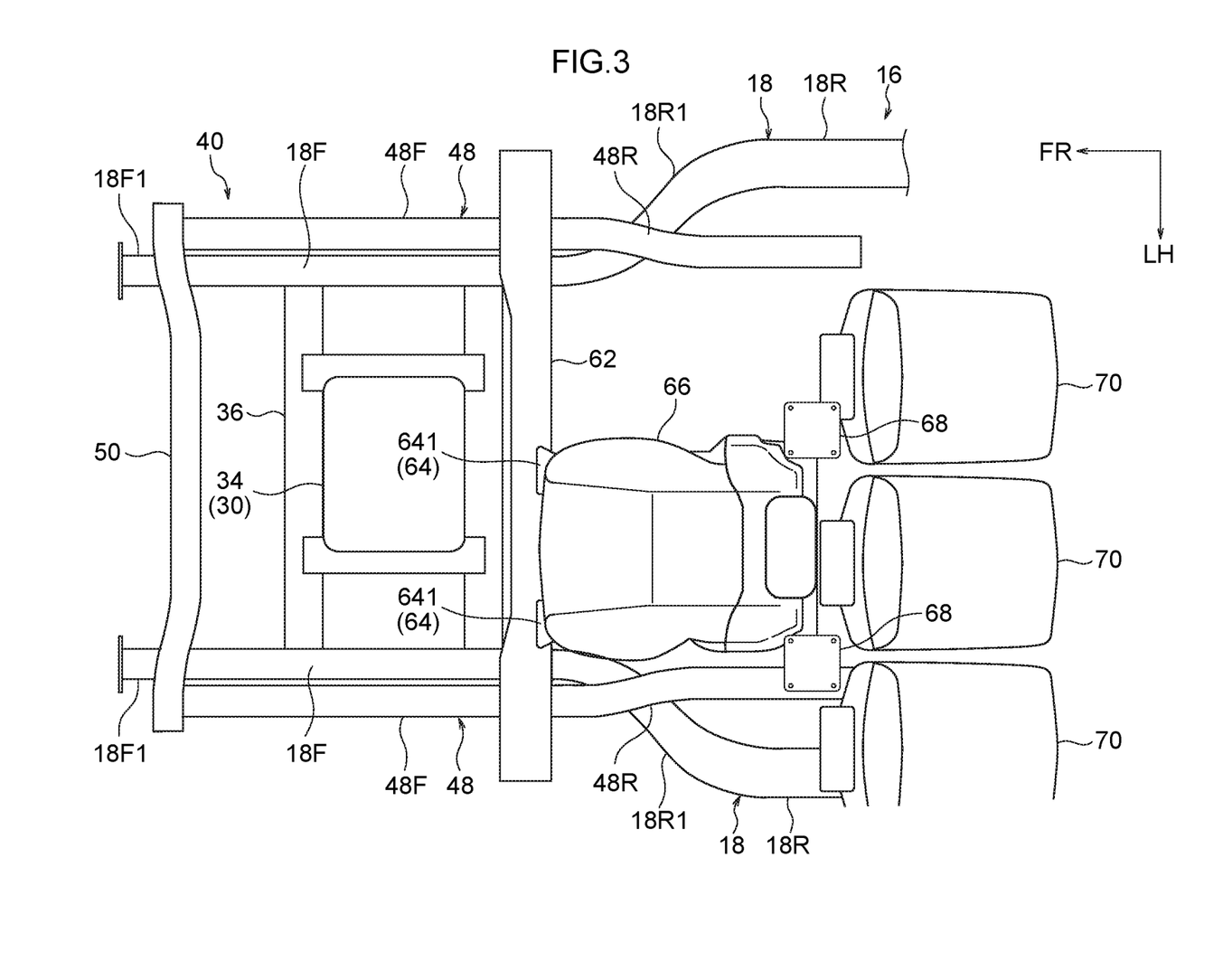
FIG. 3 is a plan view illustrating part of the configuration of the front section of the vehicle.

The front end portions of the respective upper kick sections 48R of the left and right front side members 48 are connected in the vehicle width direction by a seat cross member 62 (see FIG. 2 and FIG. 3). The seat cross member 62 corresponds to a "cross member" of the present disclosure. The seat cross member 62 is for example formed in an angular tube shape using a steel material, and extends along the vehicle width direction. Both vehicle width direction end portions of the seat cross member 62 project further toward the vehicle width direction outsides than the left and right front side members 48. The seat cross member 62 is joined to the front end portions of the respective upper kick sections 48R by welding. A rear end portion of the driving seat floor section 46F is joined to an upper face of the seat cross member 62 by welding. The seat cross member 62 supports a front end portion of a seat frame 64 from the lower side.

The seat frame 64 is a frame that supports a driving seat 66, configuring a seat of the vehicle 12, from the lower side. The seat frame 64 includes a left and right pair of vertical sections 641 extending along the vertical direction, and a horizontal section 642 extending rearward from upper end portions of the left and right vertical sections 641. Brace portions 643 span in the form of bracing between lower end portions of the vertical sections 641 and front-rear direction intermediate portions of the horizontal section 642. The lower end portions of the vertical sections 641 are fixed to the rear end portion of the driving seat floor section 46F and to the seat cross member 62 by a bolt-fastening. A rear end portion of the horizontal section 642 is fixed to vertical direction intermediate portions of a left and right pair of support pillars 68 that project upward from the front end portion of the central floor panel 47.

The left and right support pillars 68 are for example each formed in an angular tube shape using a steel material or the like, extend along the vertical direction, and are arrayed in the vehicle width direction with a spacing therebetween. Plural passenger seats 70 are disposed at the rear side of the left and right support pillars 68. The plural passenger seats 70 are arranged in a row along the vehicle width direction, and are fixed to the left and right support pillars 68 through brackets or the like. Although not illustrated in the drawings, plural other passenger seats are provided in a rear area inside the vehicle cabin 42.

Figure 4:
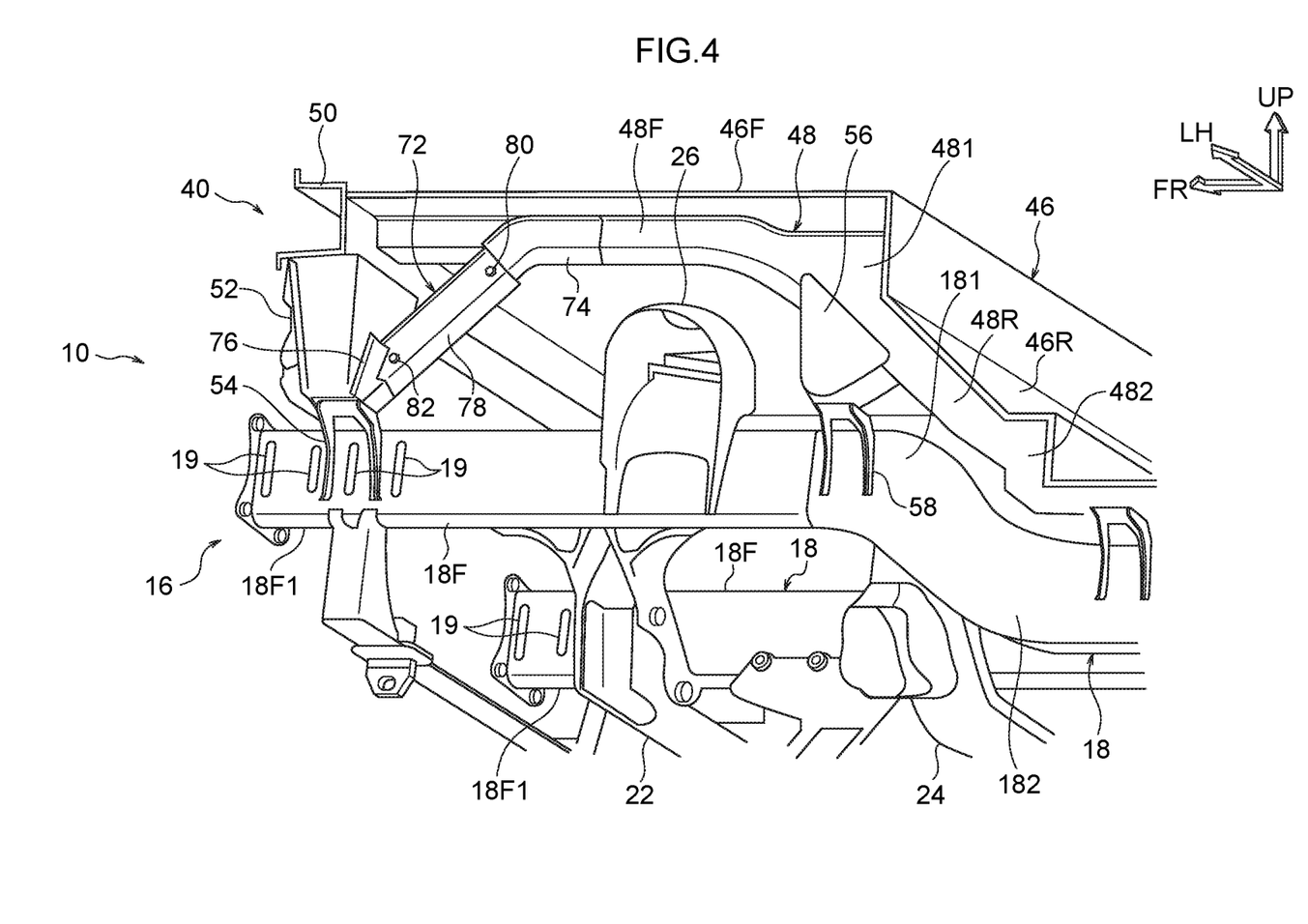
FIG. 4 is a perspective view illustrating part of the configuration of the front section of the vehicle in a state viewed obliquely from a vehicle lower rear-left side.
Figure 5:
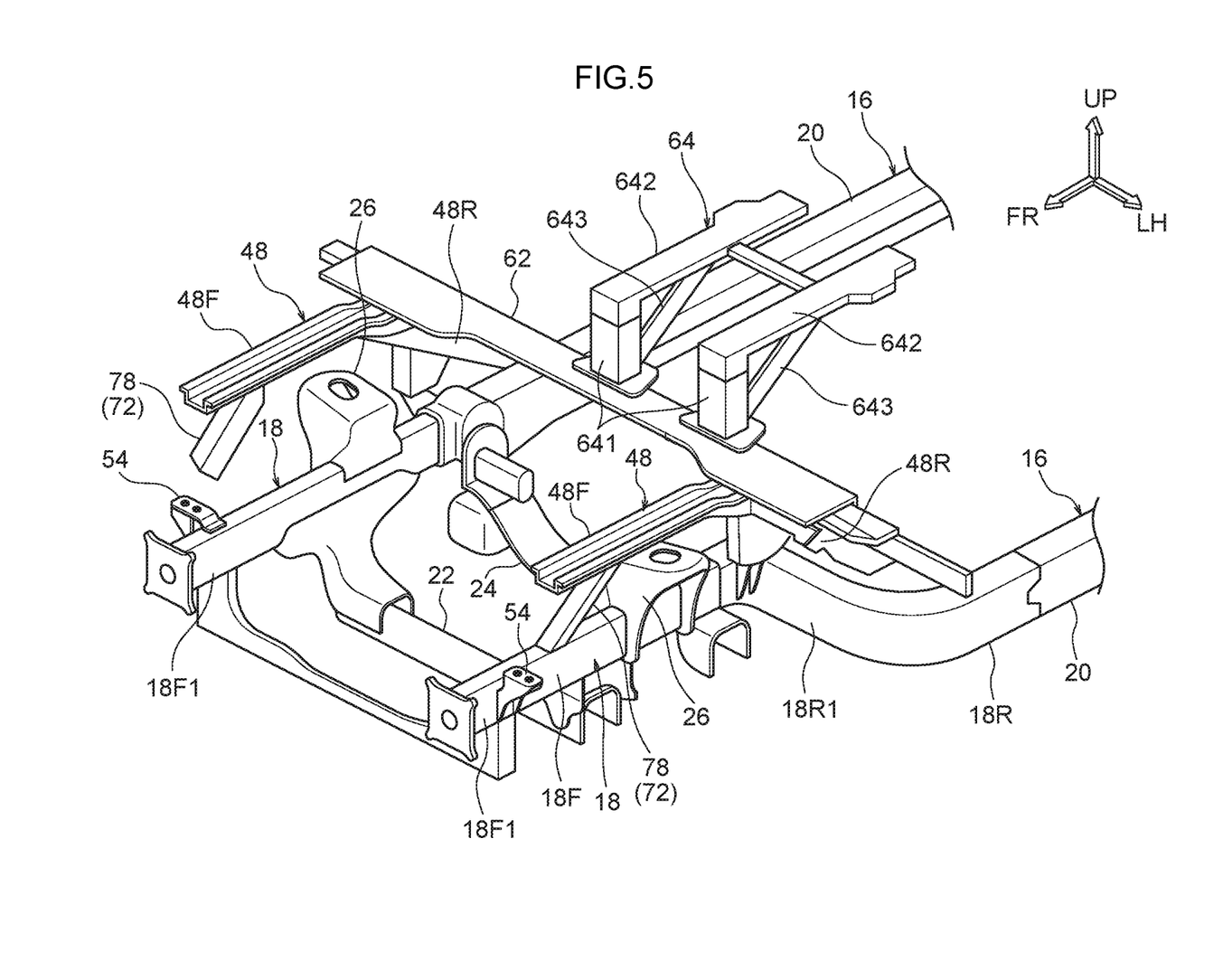
FIG. 5 is a perspective view illustrating part of the configuration of the front section of the vehicle in a state viewed obliquely from a vehicle upper front-left side.
Figure 6:
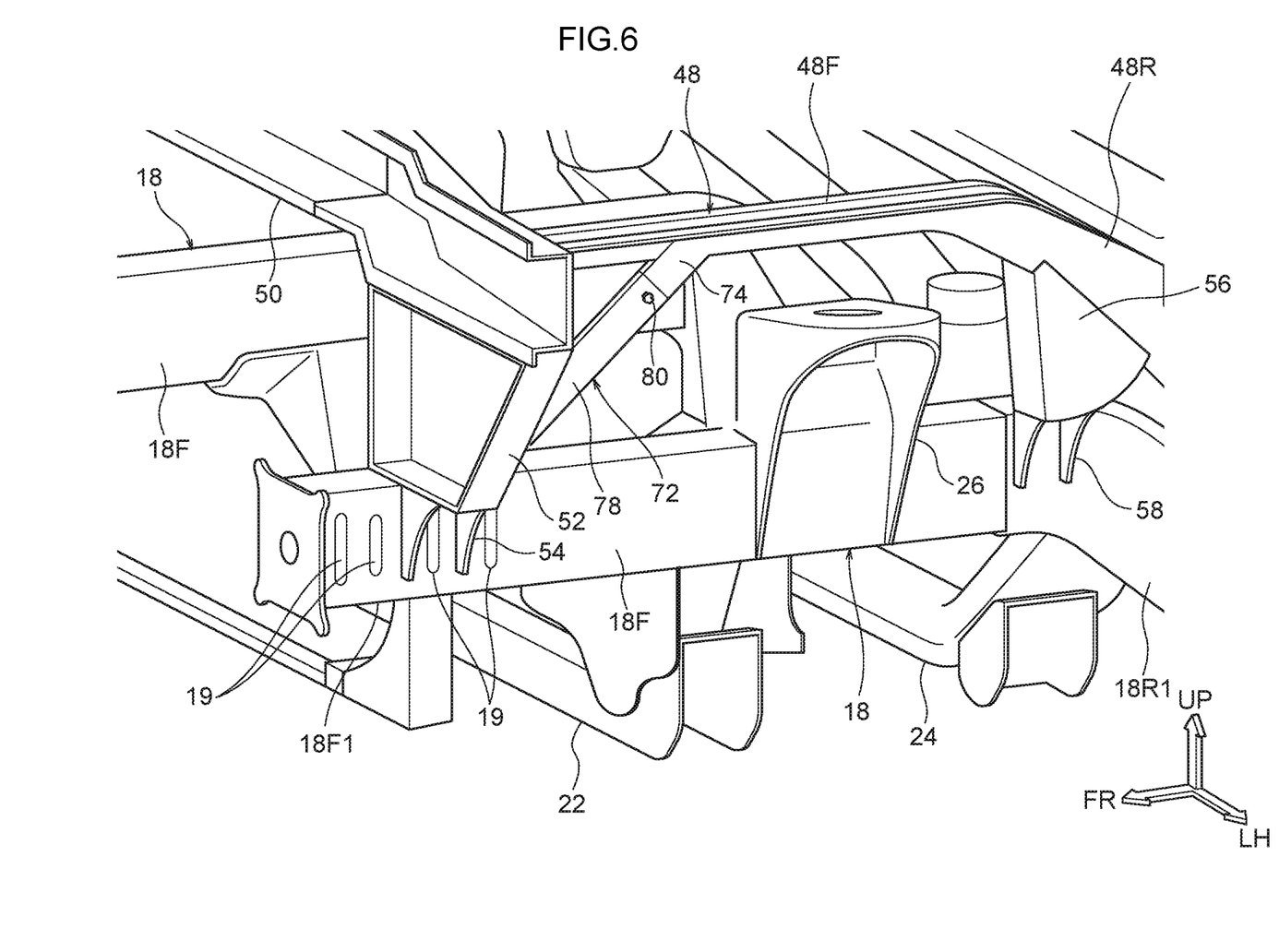
FIG. 6 is a perspective view illustrating part of the configuration of the front section of the vehicle in a state viewed obliquely from a vehicle upper front-left side and on a larger scale than in FIG. 5.
Figure 7:
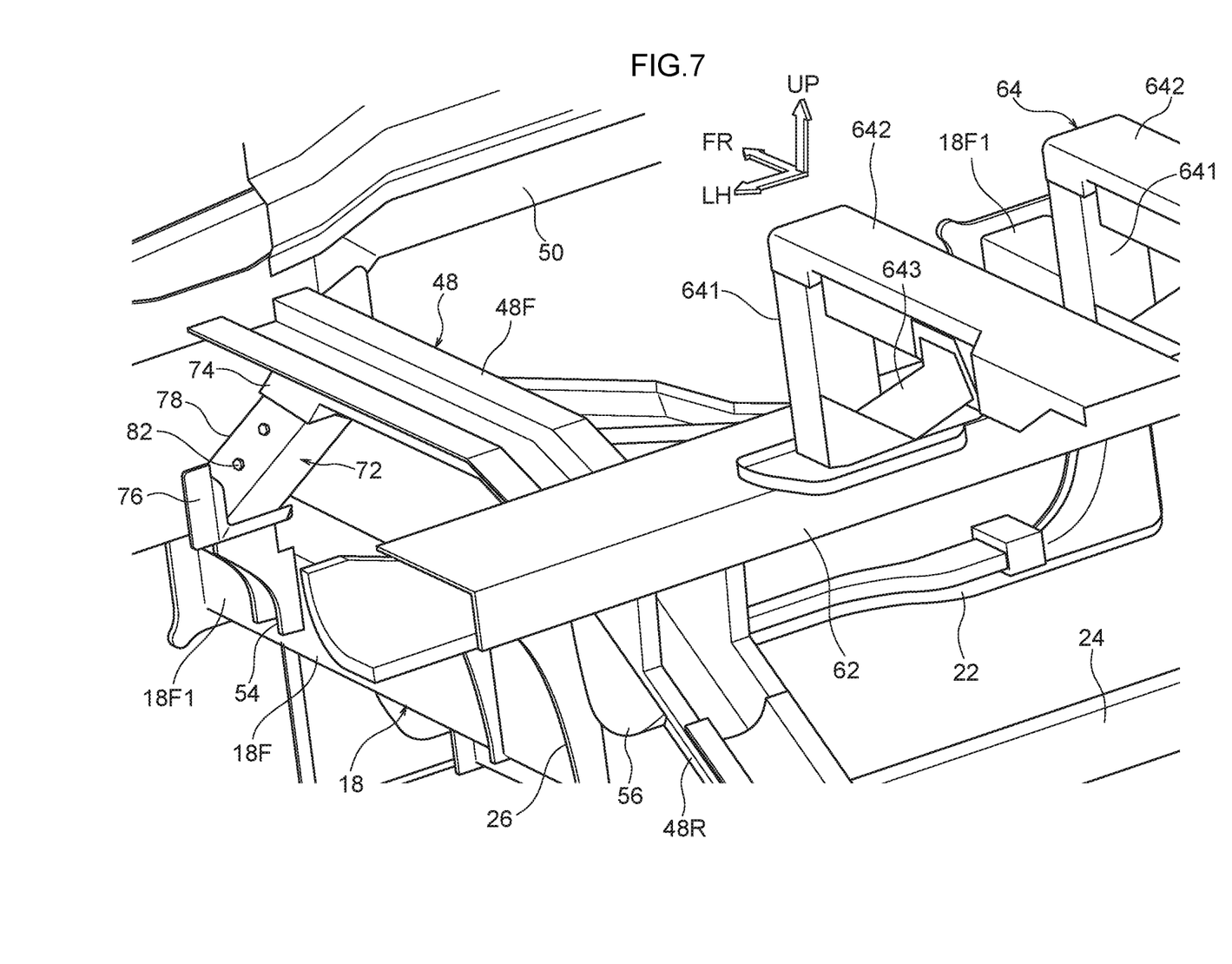
FIG. 7 is a perspective view illustrating part of the configuration of the front section of the vehicle in a state viewed obliquely from a vehicle upper rear-left side.
Figure 8:
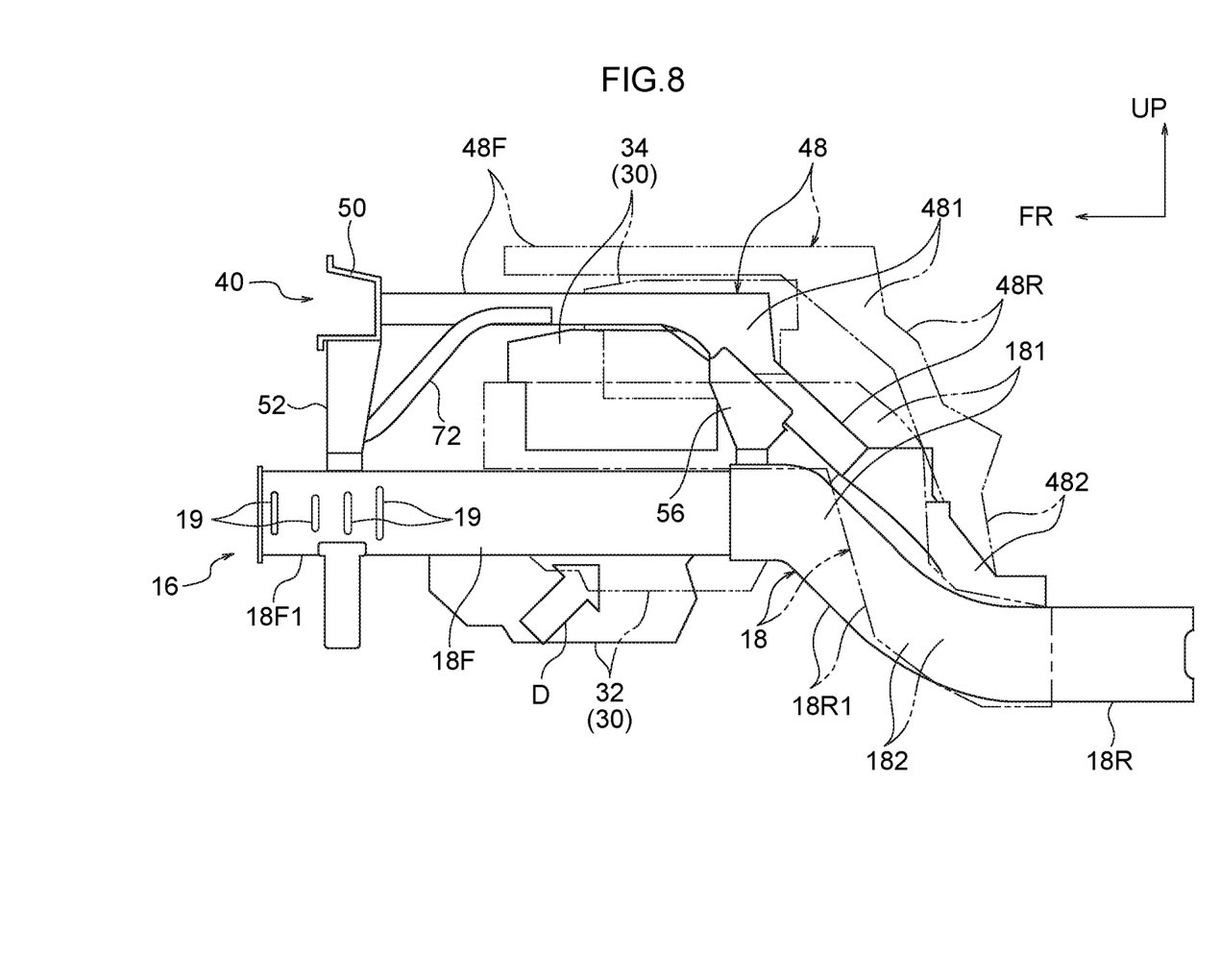
FIG. 8 is a schematic side view corresponding to part of FIG. 1 for explaining deformation of a vehicle front section at a time of head-on collision.

As illustrated in FIG. 1, FIG. 2, and FIG. 4 to FIG. 8, the deformation portions 18F1 of the left and right front side frames 18 and the corresponding front sections 48F of the left and right front side members 48 are connected by left and right coupling members 72. As illustrated in FIG. 4 and FIG. 7, each of the left and right coupling members 72 includes an upper fixing portion 74 fixed to the front section 48F of the corresponding left or right front side member 48, a lower fixing portion 76 (not illustrated in FIG. 5) fixed to the left or right front pillar member 52 and the corresponding bracket 54, and an intermediate coupling portion 78 that couples the upper fixing portion 74 and the lower fixing portion 76 together by bolts 80 and 82, respectively. The upper fixing portion 74, the lower fixing portion 76, and the intermediate coupling portion 78 are each manufactured by for example pressing sheet steel.

Each of the coupling members 72 is oriented so as to slope with an upward gradient on progression toward the vehicle rear side at the vehicle rear of the corresponding front pillar member 52, and spans in the form of bracing between the front pillar member 52 and a front-rear direction intermediate portion of the front section 48F of the corresponding front side member 48. The intermediate coupling portion 78 of the coupling member 72 and locations peripheral thereto are formed with an L-shaped cross-section profile (namely, an open cross-section profile). The coupling members 72 are configured so as to more readily undergo plastic deformation under collision load at a time of head-on collision of the vehicle 12 than the front side members 48.

Operation and Effects

Next, explanation follows regarding operation and effects of the present exemplary embodiment.

In the vehicle front section structure 10 with the above configuration, the left and right front side frames 18 that configure front sections of the ladder frame 14 of the vehicle 12 extend along the front-rear direction at respective sides in a vehicle width direction of the power unit 30, and support the power unit 30. The left and right front side members 48 extend along the front-rear direction at the upper sides of the left and right front side frames 18. The left and right front side members 48 are supported by the left and right front side frames 18, and configure part of the vehicle body 40.

Furthermore, the respective rear sections 18R, 48R of the left and right front side frames 18 and of the left and right front side members 48 include the lower kick sections 18R1 and the upper kick sections 48R that slope with a downward gradient on progression toward the vehicle rear side. Thus, stress concentrates at the bend portions 181, 182, 481, 482 of the lower kick sections 18R1 and the upper kick sections 48R at a time of head-on collision of the vehicle 12, and the lower kick sections 18R1 and the upper kick sections 48R undergo deformation at these bend portions 181, 182, 481, 482 (see the front side frame 18 and the front side member 48 illustrated by double-dotted dashed lines in FIG. 8). This deformation enables collision load to be absorbed.

Moreover, as a result of this deformation, the left and right front side frames 18 and the left and right front side members 48 are displaced obliquely toward the vehicle upper-rear side in a parallel or substantially parallel state. When this occurs, the power unit 30 disposed between the left and right front side frames 18 and supported by the left and right front side frames 18 is displaced obliquely toward the vehicle upper-rear side together with the vehicle body 40, configured in part by the left and right front side members 48. This enables the power unit 30 to be prevented from crashing into the vehicle body 40.

Moreover, in the present exemplary embodiment, the vehicle body 40 includes the front floor panel 46 configuring a floor section of the vehicle cabin 42 and supported by the left and right front side members 48 disposed at the vehicle upper side of the power unit 30. When the power unit 30 is displaced obliquely toward vehicle upper-rear side in the above-described manner, the front floor panel 46 is displaced obliquely toward the vehicle upper-rear side together with the power unit 30. This enables the electronic unit 34 of the power unit 30 to be prevented from crashing into the lower face of the front floor panel 46, thereby enabling damage to the electronic unit 34 as a result of such a collision to be prevented. This enables the front floor panel 46 (not illustrated in FIG. 8) of the vehicle cabin 42 to be made to retreat obliquely toward the vehicle upper-rear side, namely toward the opposite side to an object that has collided with the vehicle. Occupant safety is better secured as a result.

Moreover, in the present exemplary embodiment, the front end portions of the respective upper kick sections 48R of the left and right front side members 48 are connected in the vehicle width direction by the seat cross member 62 (see FIG. 2 and FIG. 3). This for example enables the deformation at the respective upper kick sections 48R of the left and right front side members 48 to be stabilized.

Moreover, the seat cross member 62 supports the front end portion of the seat frame 64 that supports the driving seat 66 of the vehicle 12. At a time of head-on collision of the vehicle 12, the left and right front side members 48 undergo deformation at the respective upper kick sections 48R, and the seat cross member 62 is displaced obliquely toward the vehicle upper-rear side together with the left and right front side members 48 and the seat frame 64. This enables the driving seat 66 supported by the seat frame 64 to be made to retreat toward the opposite side to the colliding object.

In the present exemplary embodiment, the deformation portions 18F1 that undergo compression deformation in the vehicle front-rear direction in a vehicle head-on collision are provided at the front sections of the left and right front side frames 18, and the respective deformation portions 18F1 and the front sections of the left and right front side members 48 are connected by the left and right coupling members 72. Thus, the front sections of the left and right front side members 48 are supported by the left and right deformation portions 18F1 through the left and right coupling members 72. This enables the supported rigidity of the front floor panel 46 by the front sections 48F of the left and right front side members 48 under normal circumstances to be increased.

Moreover, the left and right coupling members 72 are configured so as to more readily undergo plastic deformation under collision load at a time of head-on collision than the left and right front side members 48, and so the coupling members 72 undergo plastic deformation when the left and right deformation portions 18F1 undergo compression deformation. Thus, even in configurations in which the left and right coupling members 72 are connected to the corresponding left and right deformation portions 18F1, the left and right coupling members 72 can be prevented from hindering compression deformation of the left and right deformation portions 18F1. This enables deformation stroke of the left and right deformation portions 18F1 to be set longer in the front-rear direction. Moreover, the left and right coupling members 72 can also be utilized as members to absorb collision load. This enables collision load absorption performance to be improved.

The left and right coupling members 72 are oriented so as to slope with an upward gradient on progression toward the vehicle rear side. This enables upper end portions of the left and right coupling members 72 to be coupled to the front-rear direction intermediate portions of the front sections 48F of the corresponding left and right front side members 48. This enables flexing of the front-rear direction intermediate portions of the front sections 48F to be suppressed under normal circumstances by the left and right coupling members 72. The supported rigidity of the front floor panel 46 by the front sections 48F can be effectively increased as a result.

Moreover, in the present exemplary embodiment, both vehicle width direction end portions of the front cross member 50 that are joined to the front end portions of the left and right front side members 48 are supported by the respective deformation portions 18F1 of the left and right front side frames 18 through the left and right front pillar members 52. The left and right coupling members 72 are disposed at the rear of the left and right front pillar members 52, and span in the form of bracing between the left and right front pillar members 52 and the corresponding left and right front side members 48. This enables the left and right front pillar members 52 and the left and right front side members 48 to be reinforced under normal circumstances by the left and right coupling members 72 serving as bracing.

Note that although the left and right coupling members 72 are configured including locations formed with an open cross-section profile in the above exemplary embodiment, there is no limitation thereto, and configuration of the left and right coupling members may be modified as appropriate. For example, the left and right coupling members may be manufactured using a tube-shaped material.

Moreover, although the above exemplary embodiment includes the seat cross member 62 that connects between the front end portions of the respective upper kick sections 48R of the left and right front side members 48 in the vehicle width direction, and the front end portion of the seat frame 64 is supported by the seat cross member 62, there is no limitation thereto. The installation locations of the cross member that connects between the left and right front side members 48 in the vehicle width direction and of the seat frame may be modified as appropriate.

Moreover, although the driving seat 66 is supported by the seat frame 64 in the above exemplary embodiment, there is no limitation thereto, and the seat supported by the seat frame may be a seat other than the driving seat (such as a front passenger seat).

Moreover, although the left and right coupling members 72 span in the form of bracing between the left and right front pillar members 52 (pillar members) and the left and right front side members 48 in the above exemplary embodiment, there is no limitation thereto. For example, lower end portions of the left and right coupling members may be directly coupled to deformation portions of the left and right front side frames without being coupled to left and right pillar members.

Various other modifications may be implemented within a range not departing from the spirit of the present disclosure. Obviously the scope of rights of the present disclosure is not limited to the above exemplary embodiment.

What is claimed is:

1. A vehicle front section structure, comprising:
   a power unit disposed at a front section of a vehicle;
   left and right front side frames that extend along a vehicle front-rear direction at respective sides in a vehicle width direction with respect to the power unit, that configure a front section of a frame of the vehicle, that are configured to support the power unit, and that include a lower kick section, the lower kick section sloping with a downward gradient on progression toward a vehicle rear side and formed at a rear section of each of the front side frames;
   left and right front side members that extend along the vehicle front-rear direction at a vehicle upper side of the left and right front side frames, that are supported by the left and right front side frames, that configure a part of a vehicle body, and that include an upper kick section, the upper kick section sloping with a downward gradient on progression toward the vehicle rear side and formed at a rear section of each of the front side members;

left and right deformation portions provided at a front section of the left and right front side frames respectively, the deformation portions configured to undergo compression deformation in the vehicle front-rear direction at a time of head-on collision of the vehicle;

a left coupling member connecting the left deformation portion to a front section of the left front side member; and a right coupling member connecting the right deformation portion to a front section of the right front side member, the right coupling member and the left coupling member are configured so as to more readily undergo plastic deformation under collision load at the time of head-on collision than the left and right front side members.

2. The vehicle front section structure of claim 1, wherein:
the vehicle body includes a floor member that configures a floor section of a vehicle cabin,
the floor member is disposed at a vehicle upper side of the power unit, and
the floor member is supported by the left and right front side members.

3. The vehicle front section structure of claim 1, further comprising a cross member that connects front end portions of the upper kick sections in the vehicle width direction.

4. The vehicle front section structure of claim 3, further comprising a seat frame that:
is configured to support a seat of the vehicle; and
has a front end portion supported by the cross member.

5. The vehicle front section structure of claim 4, wherein the seat is a driving seat.

6. The vehicle front section structure of claim 1, wherein the left and right front side frames configure a part of a ladder frame.

7. The vehicle front section structure of claim 1, wherein the power unit includes a motor and an electronic unit disposed at a vehicle upper side with respect to the motor and configured to control power supplied to the motor.

8. The vehicle front section structure of claim 1, wherein the right coupling member and the left coupling member each include a portion formed with an open cross-section profile.

9. The vehicle front section structure of claim 1, further comprising:
a left front pillar member fixed to the left front side frame and the left front side member; and
a right front pillar member fixed to the right front side frame and the right front side member.

10. The vehicle front section structure of claim 1, wherein the lower kick section defines:
a first bend portion on the downward gradient bulging towards an upper-rear side of the vehicle front section structure; and
a second bend portion on the downward gradient bulging towards a lower-front side of the vehicle front section structure.

11. The vehicle front section structure of claim 1, wherein:
the vehicle body includes a floor member that configures a floor section of a vehicle cabin, that is disposed at a vehicle upper side of the power unit, and that is supported by the left and right front side members; and
the right coupling member and the left coupling member each include a portion formed with an open cross-section profile.

* * * * *